Nov. 23, 1926.
H. A. MYERS
1,607,907
AUTOMATIC AUTOMOBILE WINDOW LOCK
Filed March 11, 1926    3 Sheets-Sheet 1
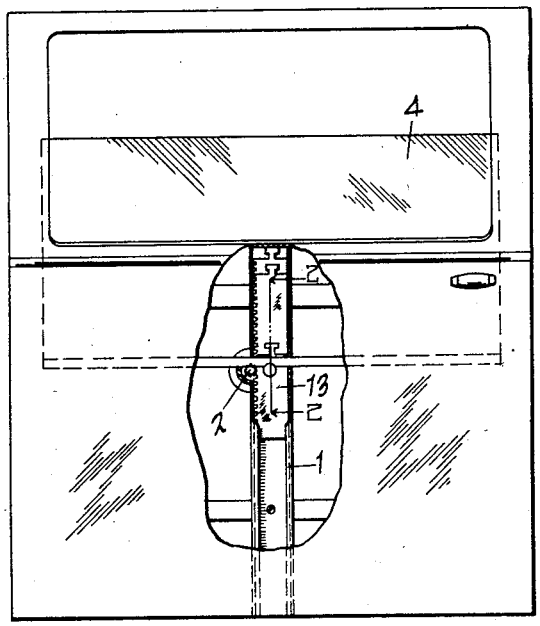
Fig 1
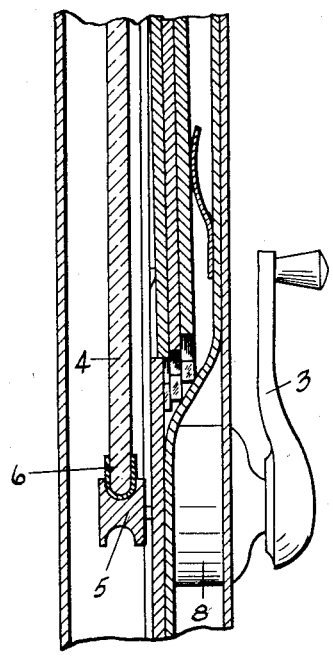
Fig 2
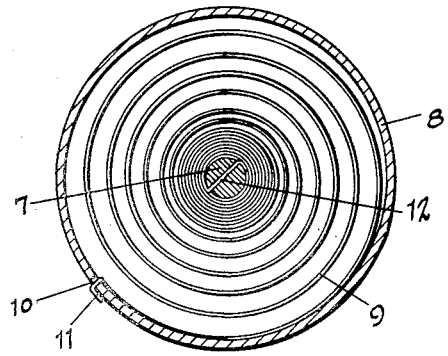
Fig 3
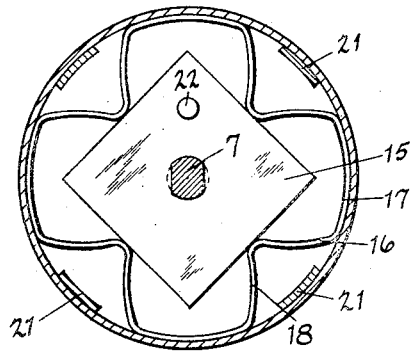
Fig 3ª
Inventor
Hubert A. Myers
By
Attorney Nov. 23, 1926.
H. A. MYERS
1,607,907
AUTOMATIC AUTOMOBILE WINDOW LOCK
Filed March 11, 1926   3 Sheets-Sheet 2
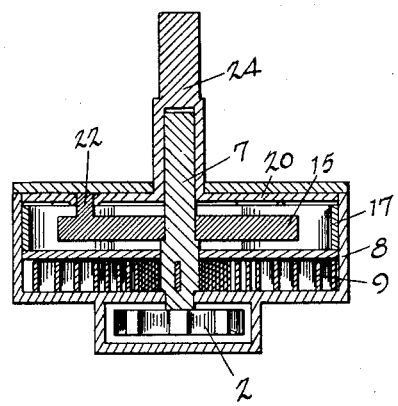
Fig 4
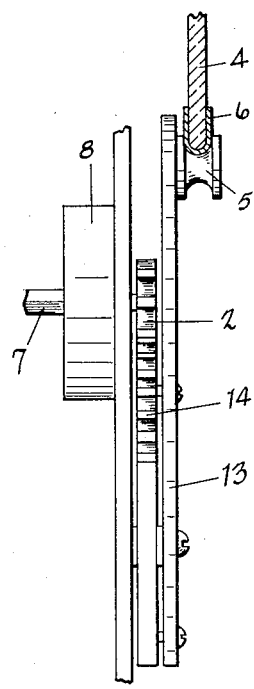
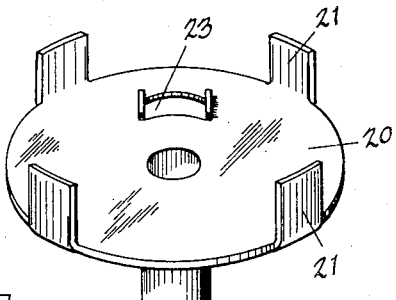
Fig 5
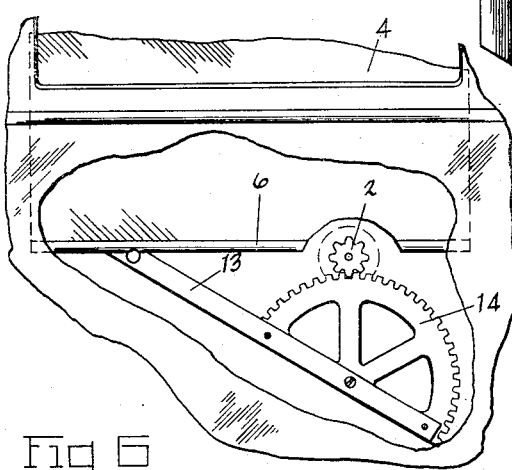
Fig 6
Fig 7
Inventor
Hubert A. Myers
By Faust H. Crampton
Attorney Patented Nov. 23, 1926.

1,607,907

UNITED STATES PATENT OFFICE.

HUBERT A. MYERS, OF TOLEDO, OHIO.

AUTOMATIC AUTOMOBILE WINDOW LOCK.

Application filed March 11, 1926. Serial No. 93,902.

My invention has for its object to provide a means for securely locking an automobile window in any position in which it may be placed. The invention utilizes a counter-balancing spring for counter-balancing the window and an engaging member that is directly connected to the counter-balancing spring so that the spring will not only counter-balance the weight, or the major portion of the weight of the window, but also coacts with the engaging member in preventing the descent of the window. The invention also provides an exceedingly compact arrangement of the parts of the automatic lock whereby it may be connected to any form of a window raising and lowering mechanism. It thus provides a means whereby any crank operated window regulator, a counter-balancing spring and a positive lock may be used to efficiently control the window and may be controlled by the crank, and wherein the operation of the window regulator may be easily performed and the window may be locked in any position to which it may be raised or lowered.

The invention also has for its object to produce a window regulator or automatic lock that may be put into quantity production at a very low cost and yet which will be exceedingly efficient. Thus my invention provides an automatic automobile window lock having parts that may be die cut and formed and assembled by the use of cheap labor.

The invention may be contained in structures that may differ in their details and to illustrate a practical application of the invention I have selected two constructions containing the invention for locking automobile windows in the positions in which they may be placed by the window regulator of any of the well known types, as examples of such structures. The embodiments of my invention selected as examples are shown in the accompanying drawings and are described hereinafter.

Figure 8:
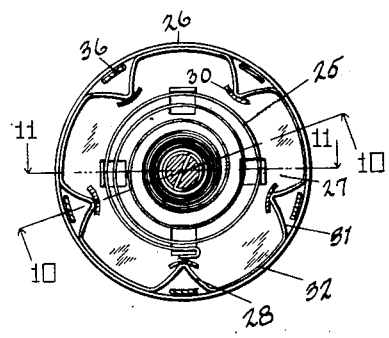
Figure 9:
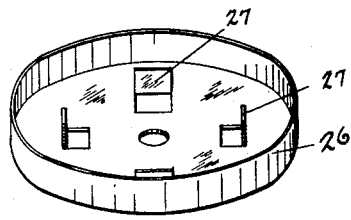
Figure 10:
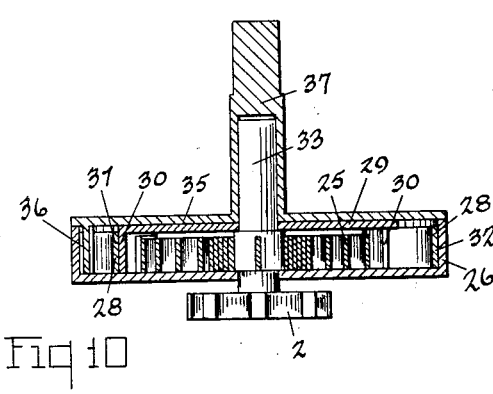
Figure 11:
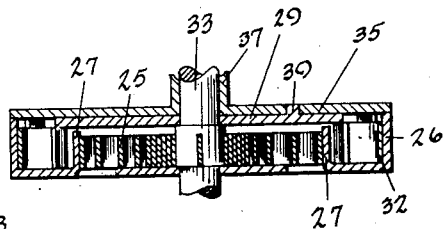
Figure 12:
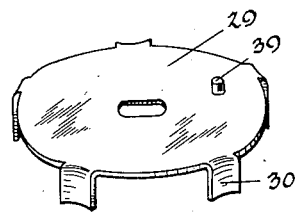
Figure 13:
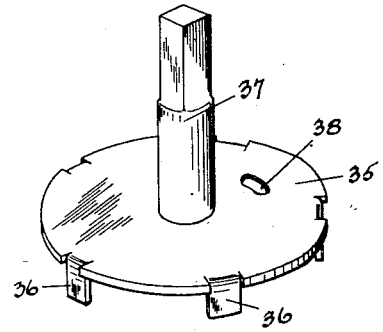

Figure 1 illustrates one form of window regulator to which my invention is applied, it consisting of a jointed or segmental rack. Fig. 2 is a view of a section taken on the plane of the line 2—2 indicated in Fig. 1. Fig. 3 is a view of a section taken through a shell and showing a counter-balancing spring located in the shell. Fig. 3ª is a view of another section through the shell illustrating a clutch member that is spring pressed by the counter-balancing spring. Fig. 4 is a view of a section through the axis of the automatic automobile window lock. Fig. 5 is a member for releasing the clutch locking member of the window. Fig. 6 illustrates another form of regulator for raising and lowering the window to which my invention may be applied, it consisting of the arm and gear type of window regulator. Fig. 7 is an edge view of the structure illustrated in Fig. 6. Fig. 8 is a view of a section through the shell of another form of automatic automobile window lock containing my invention. Fig. 9 is a perspective view of the shell. Fig. 10 is an enlarged sectional view taken on the plane of the line 10—10 indicated in Fig. 8, and Fig. 11 is a view of a section taken on the plane of the line 11—11 indicated in Fig. 8. Fig. 12 is a perspective view of a clutch member. Fig. 13 is a perspective view of a crank operated member used for controlling the member shown in Fig. 12.

In the construction shown in the drawings the window counter-balancing spring is directly connected to the shaft of the pinion which operates on a rack or gear of a window regulator, the pinion being actuated by a crank. By this arrangement the pinion is elastically held in position as against swinging movement of the crank caused by jarring of the car as it travels over the road and consequently the gradual lowering of the window is prevented. The counter-balancing spring also takes out all play of the pinion and holds the pinion tight against the rack or gear and supports the weight of the window through the rack or gear whereby all the parts of the regulator are yieldingly held as against vibration and rattling. Also the counter-balancing spring being directly connected to the pinion shaft, a more uniform action is obtained in raising and lowering the window. If the counter-balancing spring is directly connected to the window or to the member used to raise and lower the window, the spring is directly affected by the change in relation of the window actuating means to the window, and is also directly affected by the change of friction which is very marked in the different positions taken by the window. Also in the constructions shown in the drawings, the locking member is a friction clutch and the counter-balancing spring is directly connected to the pinion shaft, the crank operated directly on the counter-balancing spring and also the clutch member when the window is raised and lowered. Thus the crank actuated member will be yieldingly held by the counter-balancing spring as against any movement that might be produced by swaying or jarring of the car as it is driven along the road. The counter-balancing spring operates not only to counter-balance the weight of the window but also to constantly maintain a strong frictional clutch contact between the clutch parts. When, however, the spring is overcome by pressure of the crank to lower or raise the window, and to release the clutch parts, the subsequent movement of the crank merely performs the balance of the work as between the weight of the window and the stored energy of the spring. The pressure on the crank thus required is substantially the same irrespective of whether the window is raised or lowered and owing to the fact that the counter-balancing spring becomes directly connected to the crank, the pressure on the crank required to shift the window is always uniform.

The window regulator shown in Figs. 1 and 2 is a segmental rack that is moved along a guide-way 1 by the operation of the pinion 2 which is operated by the crank 3. The window 4 is directly connected to the rack by means of a roller or grooved headed pinion 5 which engages the channel bar 6 in which the lower edge of the window is located. The pinion 2 is connected to a shaft 7 that is rotatably supported in a shell 8. The shell is made of sheet metal that may be cut and pressed to form. A counter-balancing spring 9 is bent so as to engage in a slot 10, it having a hooked end 11 that may be inserted in the slot. The inner end of the spiral spring 9 extends into a slot 12 that is formed in the shaft 7. Before the pinion 2 is placed in mesh with the rack 13, in the form of window regulator illustrated in Figs. 1 and 2, the spring is wound up sufficiently to sustain the weight of the window which operates through the rack and tends to cause the rotation of the pinion.

A square plate 15 is connected to the shaft 7 and a metal strip 16 surrounds the plate 15. The plate 15 and the strip 16 are located in the shell 8. The strip 16 has portions 17 that substantially conform to the cylindrical wall of the shell and re-entrant portions 18 that extend to the side edges of the square plate 15. The strip 16 may be elastic and the side edges of the plate 15 operate to press the portions 17 against the cylindrical side wall of the shell 8. Also the spiral spring 9 which tends to turn the plate 15 increases the pressure of the strip 16 against the cylindrical part of the shell 8 when the load on the pinion is released by the jarring of the window as the car moves over the road, whereby there is maintained at all times a strong immediate frictional engagement by the clutch member either by reason of the weight of the window or by reason of the spring.

The crank 3 is connected to a circular plate 20 having fingers 21 that extend into the spaces formed between re-entrant portions 18 of the strip 16 and the wall of the shell. The fingers 21 when turned so as to engage the re-entrant portions 18 loosen the frictional contact between the strip 16 and the cylindrical wall of the shell 8 and permit rotation of the shaft 7. A pin 22 is located on the plate 15 and extends into a slot 23 formed in the plate 20. When the plate 20 has been rotated sufficiently to cause the fingers 21 to loosen the strip, the plate 15 will be rotated with the plate 20 by rotation of the crank. Thus the pinion 2 may be rotated in either direction to raise or lower the rack and consequently the window 4 will be aided by the counter-balancing spring 9 on the one hand or the weight of the window on the other.

In the form of automatic window lock shown in Figs. 8 to 13, the spiral counter-balancing spring 25 is located in a central part of the shell 26 and is confined by means of fingers 27 that are struck up from the bottom of the shell. A metal strip 28 is located within the space between the strips 27 and the cylindrical wall of the shell. A plate 29 has the fingers 30 which are preferably concave or spoon shaped that extend into the shell 26 and so that the lower ends of the fingers 30 will ride on the bottom of the shell. The metal strip 28 has re-entrant parts 31 that extend to the fingers 30 and so as to be engaged in the curved parts of the fingers. Thus rotation of the plate 29 will cause the portions 32 of the metal strip 28 to increase in their pressure against the cylindrical wall of the shell 26. The shaft 33 is connected to the plate 29, the spiral spring 25 and the pinion 2. The spiral spring is also connected to one of the fingers 27 and consequently the movement of the pinion 2 is locked against rotation by the strip 28 which is held in engagement with the cylindrical wall of the fixed shell by the spring 25. This engagement is maintained by the spiral spring which prevents rotation of the pinion notwithstanding jarring of the car.

A plate 35 is provided with the fingers 36 that extend into the spaces between the re-entrant parts 31 and the wall of the shell for releasing the frictional contact of the portion 32 of the strip 28 with the cylindrical wall of the shell. The plate 35 has an edge portion that extends beyond the fingers 36 which makes contact with the edge of the shell and thus closes the shell. The plate 29 may be located on or in proximity to the edges of the metal strips 25 and 28. The plate 35 may be located on the plate 29. This provided an exceedingly compact arrangement of the parts. The plate 35 may be operated by means of the crank 3, it being provided with a stem 37 that may be connected to the crank. The plate 29 is provided with a pin that extends into the slot 38 which causes the plate 29 to rotate with the plate 35 after it has moved a short distance by the operation of the crank.

In order to obtain alinement of the parts, the stem 24 and the shaft 7 in the form of construction shown in Figs. 4 and 5 may be arranged to telescope one within the other. This is also true of the shaft 33 and the stem 37.

I claim:

1. In an automatic window lock, a window regulator mechanism connected to the window for operating the window, a pinion for actuating the regulator mechanism, a shaft directly connected to the pinion, a fixed member for supporting the shaft, a window counter-balancing spring directly connected to the shaft and to the fixed member.

2. In an automatic window lock, a window regulator mechanism connected to the window for operating the window, a pinion for actuating the regulator mechanism, a shaft directly connected to the pinion, a fixed member for supporting the shaft, a window counter-balancing spring directly connected to the shaft and to the fixed member, a locking member connected to the shaft for locking the window in the position in which it is placed by the operation of the shaft.

3. In an automatic window lock, a window regulator mechanism connected to the window for operating the window, a pinion for actuating the regulator mechanism, a shaft directly connected to the pinion, a fixed member for supporting the shaft, a window counter-balancing spring directly connected to the shaft and to the fixed member, a friction clutch member connected to the shaft for frictionally locking the window in the position in which it is placed by the operation of the shaft.

4. In an automatic window lock, a window regulator mechanism connected to the window for operating the window, a pinion for actuating the regulator mechanism, a shaft directly connected to the pinion, a fixed member for supporting the shaft, a window counter-balancing spring directly connected to the shaft and to the fixed member, a friction clutch member connected to the shaft for frictionally locking the window in the position in which it is placed by the operation of the shaft and yieldingly held in engagement by the counter-balancing spring.

5. In an automatic window lock, a window regulator mechanism connected to the window for operating the window, a pinion for actuating the regulator mechanism, a shaft directly connected to the pinion, a fixed cylindrical shell, a shaft pivotally connected in the shell and directly connected to the pinion, a spiral spring directly connected to the shell and to the shaft, a crank for rotating the pinion.

6. In an automatic window lock, a window regulator mechanism connected to the window for operating the window, a pinion for actuating the regulator mechanism, a shaft directly connected to the pinion, a fixed cylindrical shell, a shaft pivotally connected in the shell and directly connected to the pinion, a spiral spring directly connected to the shell and to the shaft, a crank for rotating the pinion, the friction clutch member connected to the shaft and operating to frictionally engage the shell and means actuated by the crank for releasing the clutch in the raising and lowering movements of the crank.

7. In an automatic window lock, a window regulator mechanism connected to the window for operating the window, a pinion for actuating the regulator mechanism, a shaft directly connected to the pinion, a fixed cylindrical shell, a shaft pivotally connected in the shell and directly connected to the pinion, a spiral spring directly connected to the shell and to the shaft, a crank for rotating the pinion, a strip extending along the inner surface of the shell and having re-entrant parts, a member engaging the re-entrant parts for increasing the pressure of the strip on the shell and connected to the shaft, a second member for engaging the strip to release the pressure of the strip on the shell.

8. In an automatic window lock a window regulator mechanism connected to the window for operating the window, a pinion for actuating the regulator mechanism, a shaft directly connected to the pinion, a fixed cylindrical shell, a shaft pivotally connected in the shell and directly connected to the pinion, a spiral spring directly connected to the shell and to the shaft, a crank for rotating the pinion, a strip extending along the inner surface of the shell and having re-entrant parts, a member engaging the re-entrant parts for increasing the pressure of the strip on the shell and connected to the shaft, a second member for engaging the strip to release the pressure of the strip on the shell, a slip connector interconnecting the two members for causing the members to move together upon completion of a slight movement of one relative to the other and a crank connected to the second named member for rotating the said members.

9. In an automatic automobile window lock, a regulator mechanism connected to the window for raising and lowering the window, a pinion for actuating the regulator mechanism, a shaft directly connected to the pinion, a fixed cylindrical shell, a square plate located in the shell, a metal strip having re-entrant parts engaging the said edges of the metal plate and having portions for engaging the cylindrical wall of the shell, a member for releasing the said strip from its frictional engagement with the wall of the shell, means for connecting the said member with the said plate, a crank connected to the said member for rotating the said member, the plate and the pinion.

10. In an automatic automobile window lock, a regulator mechanism connected to the window for raising and lowering the window, a pinion for actuating the regulator mechanism, a shaft directly connected to the pinion, a fixed cylindrical shell, a square plate located in the shell, a metal strip having re-entrant parts engaging the said edges of the metal plate and having portions for engaging the cylindrical wall of the shell, a member for releasing the said strip from its frictional engagement with the wall of the shell, means for connecting the said member with the said plate, a crank connected to the said member for rotating the said member, the plate and the pinion, a counter-balancing spring connected to the shell and to the shaft for maintaining the frictional contact of the strip against the shell.

11. In an automatic window lock, a window regulator mechanism connected to the window for operating the window, a shaft for operating the regulator mechanism, a fixed shell surrounding the shaft, a strip having re-entrant portions located in the shell, and portions for making contact with the wall of the shell, a member connected to the shaft and having parts extending into the shell for engaging the re-entrant portions of the strip to increase the frictional contact of the strip against the shell upon application of pressure to rotate the member, a second member having parts also extending into the shell and to the spaces between the re-entrant parts of the wall of the shell for releasing the frictional engagement between the strip and the wall of the shell.

12. In an automatic window lock, a window regulator mechanism connected to the window for operating the window, a shaft for operating the regulator mechanism, a fixed shell surrounding the shaft, a strip having re-entrant portions located in the shell, and portions for making contact with the wall of the shell, a member connected to the shaft and supported on the edge of the strip and having parts extending into the shell to engage the re-entrant portions of the strip and to increase the frictional contact of the strip upon applying rotative pressure of the member, a second member located on the edge of the shell having parts extending into the spaces between the re-entrant parts and the wall of the shell for releasing the frictional engagement between the strip and the wall of the shell.

13. In an automatic window lock, a window regulator mechanism connected to the window for operating the window, a pinion for actuating the regulator mechanism, a shaft directly connected to the pinion, a fixed shell in which the shaft is pivotally supported, a strip having re-entrant portions located in the shell and portions for making contact with the wall of the shell, a plate connected to the shaft and having fingers extending in the shell to engage the re-entrant portions of the strap and to increase the frictional contact upon the rotation of the plate, a second plate having fingers extending into the spaces between the re-entrant parts and the wall of the shell for releasing the frictional engagement between the strip and the wall of the shell.

14. In an automatic window lock, a window regulator mechanism connected to the window for operating the window, a pinion for actuating the regulator mechanism, a shaft directly connected to the pinion, a fixed shell in which the shaft is pivotally supported, a strip having re-entrant portions located in the shell and portions for making contact with the wall of the shell, a plate connected to the shaft and having fingers extending in the shell to engage the re-entrant portions of the strip and to increase the frictional contact upon rotation of the plate, a second plate having fingers extending into the spaces between the re-entrant parts and the wall of the shell for releasing the frictional engagement between the strip and the wall of the shell, the two plates having a slip connector for moving the first plate with the second plate when the second plate has moved a short distance relative to the first plate.

In testimony whereof I have hereunto signed my name to this specification.

HUBERT A. MYERS.